United States Patent [19]

Fischer

[11] Patent Number: 4,681,477
[45] Date of Patent: Jul. 21, 1987

[54] INVISIBLE CONNECTION FOR FACED PARTS, IN PARTICULAR FOR FURNITURE

[76] Inventor: Walter Fischer, Rationalstrasse 4, D-4520 Melle 7, Fed. Rep. of Germany

[21] Appl. No.: 928,648

[22] Filed: Nov. 5, 1986

Related U.S. Application Data

[63] Continuation of Ser. No. 589,631, Mar. 14, 1984, abandoned.

[30] Foreign Application Priority Data

| Mar. 19, 1983 | [DE] | Fed. Rep. of Germany | 3309953 |
| May 7, 1983 | [DE] | Fed. Rep. of Germany | 3316855 |
| Jun. 3, 1983 | [DE] | Fed. Rep. of Germany | 3320184 |
| Oct. 21, 1983 | [DE] | Fed. Rep. of Germany | 3338224 |
| Nov. 15, 1983 | [DE] | Fed. Rep. of Germany | 3341312 |
| Nov. 25, 1983 | [DE] | Fed. Rep. of Germany | 33424547 |

[51] Int. Cl.$^4$ ................. F16B 12/04; F16B 13/02
[52] U.S. Cl. .................... 403/298; 403/292; 403/294; 403/265; 403/405.1; 403/268; 411/82; 206/219
[58] Field of Search ............. 403/298, 292, 294, 265, 403/266, 267, 268, 405.1, 406.1, 407.1; 405/260, 261; 411/23, 69, 82; 206/219, 222

[56] References Cited

U.S. PATENT DOCUMENTS

| 752,669 | 2/1904 | Guzowski | 403/268 |
| 1,394,137 | 10/1921 | Blair | 403/268 |
| 2,702,926 | 3/1955 | Rahaim | 403/298 |
| 3,298,144 | 1/1967 | Fischer | 403/268 X |
| 3,756,635 | 10/1973 | Beers | 403/267 X |
| 3,921,800 | 11/1975 | Burns | 405/261 X |
| 4,182,447 | 1/1980 | Kay | 206/220 |
| 4,263,832 | 4/1981 | Lang et al. | 405/261 X |
| 4,291,799 | 9/1981 | Bower, Jr. | 206/219 |
| 4,306,651 | 12/1981 | Mühlbauer | 206/220 |
| 4,404,875 | 9/1983 | Sadanandan et al. | 405/261 X |
| 4,537,303 | 8/1985 | Muhlbauer | 206/220 X |

FOREIGN PATENT DOCUMENTS

| 0119318 | 9/1984 | European Pat. Off. | 403/265 |
| 3309954 | 9/1984 | Fed. Rep. of Germany | 403/265 |
| 886263 | 6/1943 | France | 403/298 |
| 2500053 | 8/1982 | France | 405/261 |
| 638813 | 6/1950 | United Kingdom | 403/268 |
| 640717 | 7/1950 | United Kingdom | 403/298 |
| 766815 | 1/1953 | United Kingdom | 403/292 |
| 2067257 | 7/1981 | United Kingdom | 403/298 |

Primary Examiner—Cornelius J. Husar
Assistant Examiner—Todd G. Williams
Attorney, Agent, or Firm—Collard, Roe & Galgano

[57] ABSTRACT

An invisible connection for faced parts, in particular for furniture. The adhesive for the connection is hermetically enclosed in a sheath consisting of flexible or easily breakable material. The sheath of adhesive is introduced as an independent component into the borehole of the connection, the sheath being destructible on driving-in or pressing-in the connecting member.

13 Claims, 5 Drawing Figures

INVISIBLE CONNECTION FOR FACED PARTS, IN PARTICULAR FOR FURNITURE

REFERENCE TO RELATED APPLICATIONS

This is a continuation application of application Ser. No. 589,631, filed Mar. 14, 1984, for "INVISIBLE CONNECTION FOR FACED PARTS, IN PARTICULAR FOR FURNITURE", now abandoned.

BACKGROUND OF THE INVENTION

The present invention relates to an invisible connection for faced parts, in particular for furniture of wood or chipboard, involving use of adhesive and a connecting member. In such a connection the adhesive is introduced in fluid form or in the form of a paste into cylindrical boreholes in the parts to be connected and the connecting member is driven or pressed at each of its two ends into the boreholes. The connecting member has a form which is symmetrical about its axial midpoint and is provided with one or more longitudinally extending grooves and annular notches and/or other profiling on the outside of the member and each of the two end faces of the connecting member is formed so as to extend to a point or each has a point. The term "invisible connection" as used herein refers to a connection which is not apparent to the eye, at least when the joined-together parts are viewed.

For the invisible connection of faced parts in furniture, for example for the right-angled connection of a side wall of the body of an article of furniture to the floor of the article, a multiplicity of connecting members are known. These connecting members are introduced into prepared cylindrical bores in the parts to be connected. For improving the rigidity, a fluid or pasty material with gluing or adhering and/or foaming up properties is introduced into the cylindrical bore before the introduction of the connecting member. This introduction of the adhesive is time consuming and requires a high degree of care. Soiling of the surfaces of the faced parts cannot be avoided. An exact dosage of the quantity of the adhesive required for each borehole is necessary, but this cannot be brought about without waste. The adhesive introduced into the borehole is forced principally against the end wall of the borehole and in part into the chipboard by the connecting member when it is introduced. A uniform distribution of the adhesive over the length of the connecting member does not take place. After the introduction of the adhesive the making of the connection must take place in a relatively short time, since otherwise a hardening of the adhesive will occur.

The preparation of this connection requires knowledge in a special field. Therefore, in the case of later assembled furniture parts, for example after transport of the furniture parts on pallets in order to save space, connection of the faced parts is not carried out by use of an adhesive in combination with connecting members introduced into the cylindrical boreholes, but in general a problem free screw connection is used. This screw connection is adequate enough from the technical point of view but not however from the aesthetic point of view, since it remains visible and is thereby prejudicial to the appearance of the furniture.

In order to achieve an interference fit, the diameter of the connecting member is slightly greater than the diameter of the borehole. The connecting member must be driven or pressed into the borehole in each case in order to produce a secure and fully close connection between the parts. In this it cannot be excluded that a forcing out of adhesive material may occur at the outer edge of the borehole.

It is an object of the present invention to provide an invisible connection of the kind described above, in which the adhesive is introduced into the boreholes in the precise dosage required with little waste and without danger of soiling the surfaces of the parts to be connected, and in which the making of the connection is not tied in time to the introduction of the adhesive, a uniform distribution of the adhesive over the length of the connecting member being achieved and the connecting means being formed so that no press tool or driving tool is necessary for its introduction into the borehole in achieving an extremely rapid and secure connection between the parts.

SUMMARY OF THE INVENTION

According to the invention, there is provided an invisible connection for faced parts, in particular for articles of furniture of wood or material similar to wood, involving the use of adhesive and a connecting member. In this connection the adhesive is introduced in fluid form or in the form of a paste into cylindrical boreholes in the parts to be connected and the connecting member is driven or pressed at each of its two ends into the boreholes, the connecting member has a form which is symmetrical about the axial mid-point of the member, one or more longitudinally extending grooves and annular notches and/or other profiling are provided on the outside of the member and each of the two end faces of the connecting member is formed so as to extend to a point or each has a point. The adhesive is hermetically enclosed in a sheath and the sheath with the enclosed adhesive is formed to be introduced as an independent component into the borehole, the sheath being destructible on driving in or pressing in of the connecting member. The connecting member may consist of a cylindrical blank of wood or another material which is statically stable and is able to swell up, the blank being compressed to a predetermined degree and having a diameter which is smaller than the diameter of the borehole. In carrying out the invention, the sheath may be formed from a flexible material or from a breakable material, preferably glass.

The adhesive hermetically enclosed in a sheath may advantageously be pressed or blown into the cylindrical borehole immediately after the production of the borehole. Since the outer diameter of the flexible sheath is slightly greater than the diameter of the borehole, the flexible sheath jams after its introduction into the borehole. In this way it is possible to introduce the adhesive independently in time from the making of the actual connection between the faced parts. One or more clamping elements may be provided on the exterior of the sheet for clamping the sheath in the borehole. The clamping element may be flexible and extend uniformly over the periphery of the sheath in an evenly distributed manner about the periphery. The sheath may have a substantially cylindrical form with a covering on an end face. The covering may be connected to the cylindrical wall of the sheath by welding. This cylindrical wall may have a peripheral angled-out part and the covering, which may be of foil, may project over the cylindrical wall of the sheath to form a clamping element. The covering may then be sealed flush with the peripheral angled-out part of the wall.

The assembly of the individual parts with use of an adhesive enclosed in a sheath in combination with connecting members may also be carried out in an extremely clean manner by unskilled people, for example, in do-it-yourself. The volume of adhesive enclosed in the sheath may be measured out for the particular use in each case. It has a storage life over quite a long period of time, which may amount to years. The sheath itself is destroyed on introduction of the connecting member into the cylindrical borehole and the adhesive is thereby released. Where the sheath is of glass, it may have one or more peripheral constrictions on the glass sheath, a cylindrical nozzle being provided on the outer surface of the sphere. The nozzle may be closed to the outside by melting, by means of an elastic body or plug or by a cap.

The longitudinal grooves provided on the outside of the connecting member preferably continue to the end faces of the member. The outer surface may also be destroyed at a number of places by cutting-in so that the cross-grain is exposed. This destruction may be carried out in the end regions of the connecting member, for example, by one or more annular millings or cuts. By exposing the cross-grained wood of the cylindrical connecting member, this cross-grained wood being known to have poor resistance to penetrating moisture, the ability of the wood or of the material which is similar to wood to swell up is substantially improved and the connecting effect is also therefore substantially improved. Also, moisture contained in the adhesive is taken up significantly quicker and thus the period of time for the establishment of a rigid joint is shortened. As a result of the ability of the connecting member to swell up speedily, no vibration occurs in the joining of the individual parts. The occurrence of so-called hair cracks is therefore excluded. The joining effect is substantially accelerated and increased to a still further extent by the chipboard or wood sheet of the body of the article of furniture also taking up a part of the moisture of the adhesive and thereby swelling up, having regard to the possibilities available to it to do so. In this way, the sheet expands into the annular contours and forms so-called tongues. This tongue and groove connection is able to transfer quite large forces, and may be formed after hardening of the adhesive between the connecting member and a chipboard panel of the body of an article of furniture. The tongue is formed by the chipboard panel as a result of take-up moisture from the adhesive and conforms to the annular milling on the connecting member.

In the manufacture of a connecting member for the connection according to the invention, a cylindrical blank for the member may be compressed to a predetermined degree and during this, profiling is simultaneously pressed-in or cut-in on the outer surface of the member.

BRIEF DESCRIPTION OF THE DRAWINGS

The invention will be described and understood more readily when considered together with the accompanying drawings, in which.

DESCRIPTION OF THE PREFERRED EMBODIMENTS

Figure 1:
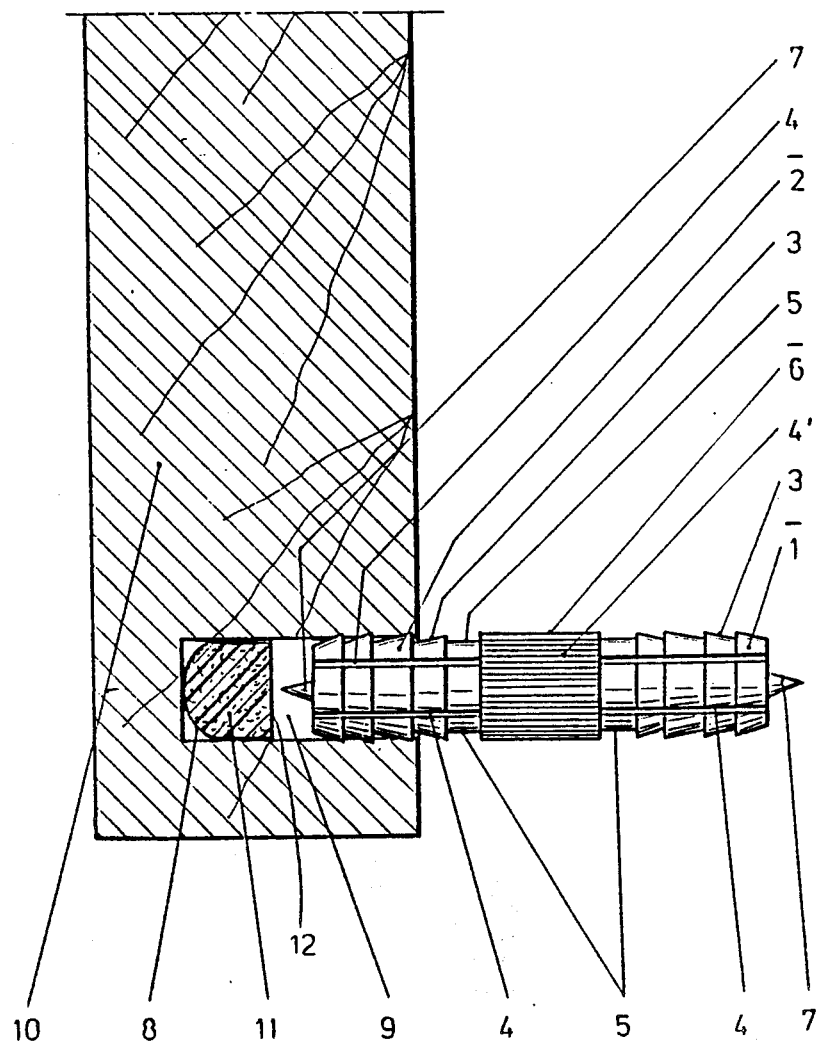
FIG. 1 is a section through a flexible sheath introduced into a borehole and containing an adhesive, with a connecting member before its impingement against the flexible sheath.

As shown in FIG. 1, an adhesive 11 located in a flexible sheath 8 is pressed in or blown in as an independent component into a cylindrical borehole 9 located in a sidewall 10 of the body of an article of furniture. Since the diameter of the flexible sheath 8 is somewhat greater than the diameter of cylindrical borehole 9, flexible sheet 8 with adhesive 11 is held securely in borehole 9, as hereinafter described. For this flexible sheath 8 can have any suitable form. The quantity of adhesive 11 heremetically enclosed in flexible sheath 8 is exactly measured out for the particular use.

The connecting member is formed as a unit and consists of a base portion 1 and a connecting portion 2, each of which has the same length. On the outer surface of the connecting member, annular notches 3 are arranged, which are directed towards each other and have identical diameters, their widths being of different magnitudes. The connecting member can be produced from any suitable material, for example, from wood, plastic, cast iron or a combination of different materials.

Figure 5:
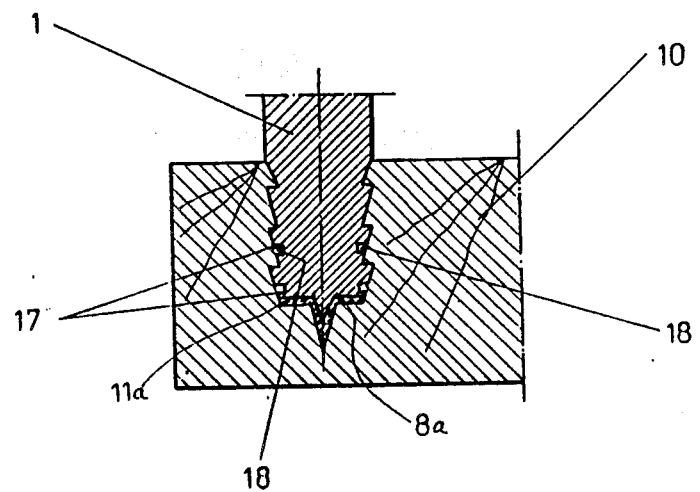
FIG. 5 is a section through a connection between a connecting member and a side wall of the body of an article of furniture (chipboard sheet) after joining has taken place.

Between base portion 1 and connection portion 2, a central cylinder portion 6 is provided. For receiving the forcing out of the material at the outer edge of borehole 9 which occurs on the introduction of the connecting member into the cylindrical borehole 9, annular grooves 5 are provided between the cylinder portion 6 and the base portion 1 and the connecting portion 2 respectively. There is a point 7 on each of the two end faces, which serves to destroy the flexible sheath 8 for adhesive 11 and thereby facilitates the release of the adhesive. At the same time an additional anchoring of the connecting member in the end wall of the borehole 9 is thereby achieved. As clearly seen in FIG. 5, the fractured sheath 8a and distributed adhesive 11a are distributed in borehole 9.

On the outside of the connecting member, grooves 4 are provided which are arranged to extend longitudinally in the region of the base portion 1 and the connecting portion 2. The outer surface of the cylinder portion 6 has very fine fluting 4', which can extend in any suitable manner.

Figure 2:
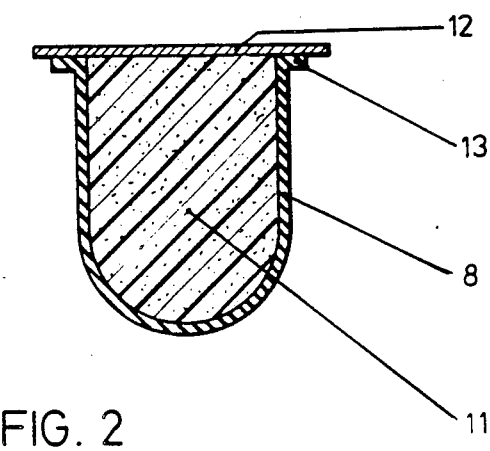
FIG. 2 is a section through another arrangement of a flexible sheath containing an adhesive.

As shown in FIG. 2, flexible sheath 8 may be made of plastic and has a substantially cylindrical form, with a covering 12 on its end face, this covering 12 being welded (e.g., ultrasonically welded) to a peripheral angled out part 13 of sheath 8, so that adhesive 11 is hermetically enclosed. Covering 12 on the end face consists of a foil and projects over the peripheral angled-out part 13. It serves simultaneously as a flexible clamping element for flexible sheath 8 introduced into borehole 9, as clearly seen in FIG. 1. The periphery of covering 12 extending beyond sheath 8 engages with the wall of borehole 9 when sheath 8 has been pressed thereinto since the diameter of covering 12 is slightly greater than the diameter of borehole 9. This engagement of covering 12 with the wall of borehole 9 results from the flexure of covering 12 and serves to secure sheath 8 within borehole 9. By the provision of one or more clamping elements, it is possible to use sheaths 8 of similar size for each of a number of different diameters of borehole and in spite of that to achieve an excellent clamping of sheath 8 in borehole 9. The clamping effect in borehole 9 is in this embodiment of flexible sheath 8 not therefore now achieved directly by sheath 8, but by means of the flexible clamping elements disposed on the outer side of the sheath. By this, the introduction of the flexible sheath 8 filled with an adhesive 11 into the cylindrical borehole 9 is also facilitated, since it is not now sheath 8 itself which must be compressed but rather only the flexible clamping elements.

The form of flexible sheath 8 as shown in FIG. 2 facilitates forming by the deep drawing with heating method, preferably from a flat sheet. The covering 12 for the front face is welded on after filling of the adhesive into the cylindrically formed sheath 8 and subsequently the flat sheet is divided by burning or by stamping into the individual sheaths 8 which are now hermetically sealed.

Figure 3:
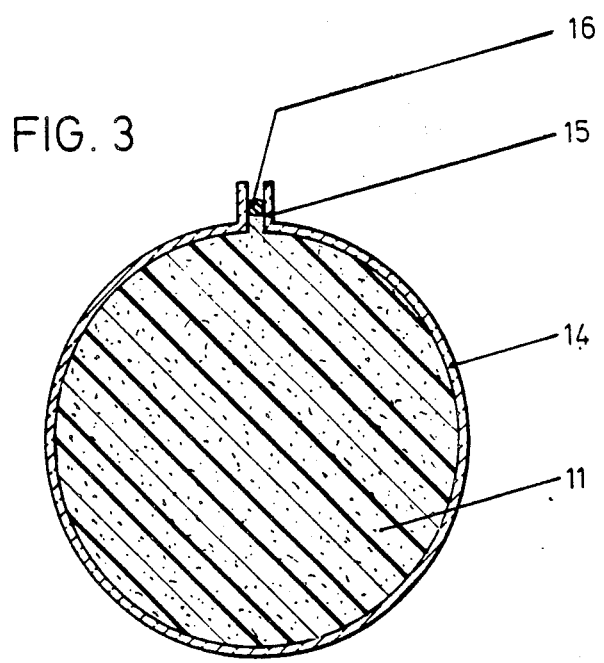
FIG. 3 is a section through yet another arrangement showing a sheath of glass containing an adhesive.

The spherical-form sheath 14 of FIG. 3 consists of an easily breakable material, for which glass is particularly suited, and is filled with adhesive. A cylindrical nozzle 15 is provided on the wall of sheath 14, this nozzle being hermetically closed off against the outside by means of an elastic body 16.

In the case of a sheath 14 consisting of glass, the individual glass splinters of destroyed sheaths 14 are pressed into the walls of the cylindrical borehole 9 by the pressure of the connecting member and in part are also pressed into the connecting member itself which consists of wood, the glass fragments thereby providing an additional connection between the connecting member and the walls of the boreholes 9 of the parts to be connected.

Figure 4:
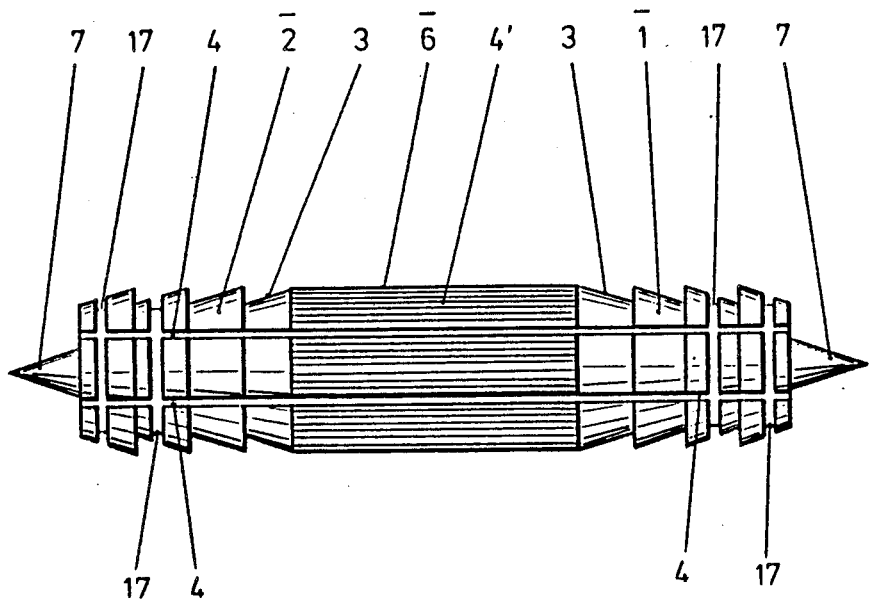
FIG. 4 is a section through a connecting member.

The connecting member shown in FIG. 4 consists of wood or an equivalent material and has a smaller diameter than the diameter of borehole 9. The blank for the connecting member is compressed to a predetermined degree and thereby at the same time the annular notches 3, the longitudinally extending grooves 4, the very fine fluting 4' and the annular contouring 17 are pressed in and/or cut out on the outer surface.

In a preferred embodiment, borehole 9 has a diameter of 8 mm. The diameter of the blank for the connecting member has an initial diameter of 8.7 mm and is compressed to a diameter of 7.9 mm. As a result of taking up the content of bound water, the connecting member swells to a diameter of more than 8.2 mm, in general to a diameter of 8.8 mm, so that a strong interference fit of the connecting member introduced into the borehole 9 is thereby achieved.

By means of annular contouring 17, the cross-grain of the cylindrical connecting member is uncovered, by which its ability to swell up is still further improved with a simultaneous shortening in the time to establish the joining effect. Both the connecting member and the chipboard or wood panel 10 of the body of the article of furniture take up moisture from adhesive 11 and thereby swell up. In this way chipboard panel 10 expands into annular contourings 17 of the connecting member and forms the keys 18, as clearly seen in FIG. 5.

It is understood that the foregoing general and detailed descriptions are explanatory of the present invention and are not intended to be restrictive of the scope of the following claims.

What is claimed is:

1. An invisible connection for faced parts, in particular for articles of furniture of wood or material similar to wood, involving the use of adhesive and a cylindrically shaped connecting member having two end faces, in which connection said adhesive is introduced in fluid form or in the form of a paste into cylindrical boreholes in the parts to be connected and said connecting member is driven or pressed at each of its two ends into the boreholes, said connecting member having a form which is symmetrical relative to a vertical central axis, at least one longitudinally extending groove, and at least one annular notch being provided on the outer surface of said member and each of said two end faces of said connecting member being formed with a point, wherein said adhesive is hermetically enclosed in a substantially cylindrically shaped sheath having a peripheral angled-out part at an end face thereof with a covering thereon, said sheath with said enclosed adhesive being of a size such that it may be introduced as an independent component into the borehole, said covering projecting over the cylindrical wall of the sheath so as to form a clamping element for clamping the sheath in the borehole, said sheath being pierced by the point on the end face of said connecting member and crushed, within the borehole, by said connecting member when said connecting member is driven or pressed into the borehole.

2. A connection according to claim 1, wherein the volume of adhesive enclosed by said sheath is measured for the particular purpose of use.

3. A connection according to claim 1, wherein said sheath is formed from a flexible material.

4. A connection according to claim 1, wherein said clamping element is formed to be flexible and is arranged to extend uniformly over said periphery of said sheath and to be evenly distributed about said periphery.

5. A connection according to claim 1, wherein the connection of said covering to the cylindrical wall of said sheath is carried out by welding.

6. A connection according to claim 1, wherein said covering is sealed flush with said peripheral angled-out part.

7. A connection according to claim 1, wherein said connecting member consists of a cylindrical blank of wood which is compressed to a predetermined extent having a diameter which is smaller than the diameter of the borehole, and then swells to a diameter larger than the borehole diameter after being placed into the borehole.

8. A connection according to claim 7, wherein said longitudinally extending grooves provided on the outer surface of said connecting member continue to the end face thereof.

9. A connection according to claim 7, wherein said connecting member includes cross grain and said cross-grain is exposed at several places by cutting-in to said outer surface of said connecting member.

10. A connection according to claim 9, wherein said cross-grain is exposed adjacent to said two end faces of said connecting member.

11. A connection according to claim 7, wherein at least one annular groove is provided.

12. A connection according to claim 11, wherein said connecting member is driven into an article of furniture body wherein said connecting member and said body absorb moisture from said adhesive and swell up, said body thereby expanding into said annular groove and forming therein a tongue and groove connection between said connecting member and said body, after said adhesive hardens.

13. A connection according to claim 12, wherein said article of furniture body is a chipboard panel.

* * * * *